United States Patent [19]

Cooper et al.

[11] 4,222,115
[45] Sep. 9, 1980

[54] SPREAD SPECTRUM APPARATUS FOR CELLULAR MOBILE COMMUNICATION SYSTEMS

[75] Inventors: George R. Cooper; Raymond W. Nettleton, both of West Lafayette, Ind.

[73] Assignee: Purdue Research Foundation, West Lafayette, Ind.

[21] Appl. No.: 886,099

[22] Filed: Mar. 13, 1978

[51] Int. Cl.² .............................................. H04K 1/04
[52] U.S. Cl. ......................................... 375/1; 455/54; 370/92
[58] Field of Search ................... 325/30, 38 R, 42, 56, 325/65, 32, 473, 55; 343/175, 177; 364/819, 824; 179/2 EA, 2 EB, 15 AP, 15 BA, 15 BZ; 178/67

[56] References Cited

U.S. PATENT DOCUMENTS

| | | | |
|---|---|---|---|
| 3,151,295 | 9/1964 | Haviland | 325/3 |
| 3,239,761 | 3/1966 | Goode | 179/15 BZ |
| 3,819,872 | 6/1974 | Hamrick | 179/2 EB |
| 3,846,583 | 11/1974 | Boulter | 178/67 |
| 3,922,678 | 11/1975 | Frenkel | 325/29 |

*Primary Examiner*—Benedict V. Safourek
*Attorney, Agent, or Firm*—John R. Nesbitt

[57] ABSTRACT

An apparatus is disclosed for a cellular mobile communication system utilizing a spread spectrum. A plurality of fixed base stations is connected with a central processor so that calls originating in any cell can terminate in any other cell. The available frequency spectrum is divided such that one-half is used for mobile-to-base station transmission and the other one-half is used for base station-to-mobile unit transmission. A power control/mobile locator system and method is utilized in all mobile units to compensate for changes in signal level and to maintain the average received signal level at the base station constant regardless of the location of the mobile unit within the cell. In addition, each mobile unit has a unique set of time-frequency coded waveforms that are used for both transmission and reception. The waveforms have large time-bandwidth products so that interfering signals are well suppressed, and which provide a large set of signals so that each user can be assigned a unique set of waveforms. Message modulation is accomplished by digitizing the speech and encoding the resulting binary sequences into the set of waveforms available to the user, while detection is accomplished by a demodulation system and method in which the phases of each received waveform are compared with those of the preceding waveform.

20 Claims, 15 Drawing Figures

SPREAD SPECTRUM APPARATUS FOR CELLULAR MOBILE COMMUNICATION SYSTEMS

The Government has rights in this invention pursuant to Grant No. ENG75-15649 awarded by the National Science Foundation.

Field of the Invention

This invention relates to communication systems and, more particularly, relates to utilizing a spread spectrum for cellular mobile communication systems.

BACKGROUND OF THE INVENTION

The land mobile radio service has been in existence for some decades. With few exceptions, the service has been restricted to voice communication via frequency-modulation channels. Current practice is to use a central base-station in a given service area, transmitting sufficient power to cover the entire area with adequate field strength. In some cases, satellite stations transmitting the same message may be used to boost signal strength in hard-to-reach areas (the practice known as "simulcasting").

The current technology has the following limitations:

(1) Large transmitted powers are needed to provide adequate coverage in radio "shadow" areas. The resulting field strength pattern is several orders of magnitude more intense than it need be over a large portion of the service area;

(2) Because of the high power required, each radio channel may be used once only over a wide geographical area. This is a highly inefficient use of the available spectrum, and makes necessary increasing use of spectral space as the demand for the service grows; and (3) The quality of speech is poor because of the phenomenon known as Rayleigh Fading. The subjective effect is of repeated submersion of the required signal in background noise, frequently many times per second if the mobile unit is in motion.

Much recent technical literature has been addressed to the use of a cellular structure as a means of increasing the efficiency of the land-mobile radio service. The proposal is to divide the service area into cells (most often hexagons), each with a base station at its center. The communication link is completed by land line, with radio channels bridging the small gap between each mobile and its nearest base station. If a mobile moves to a new cell, the radio link is switched to the new base station.

The advantages claimed for the cellular/FM LMR system are as follows:

(1) Relatively low transmitted powers are required because each base station need only provide adequate field strength within its own cell;

(2) Each channel may be used more than once, provided this is done in cells which are separated by a sufficient distance. Hence the total set of available channels is divided into subsets, each assigned to a widely distributed group of cells. Adjoining and other nearby cells are all assigned different sets of channels, so that cochannel interference is controlled by the geographic pattern of channel assignments (this strategy results in increased efficiency in the system's use of spectral space); and (3) The amount of cochannel interference is largely determined by the pattern of channel assignments, and not by cell size. Hence increased demand for service can be accommodated by dividing cells into smaller units.

The limitations and disadvantages of the proposed cellular/FM system are as follows:

(1) The effect of Rayleigh Fading upon signal quality is even worse than in existing systems, because background noise is augmented by cochannel interference;

(2) There is an inverse relationship between the number of channels per MHz which can be assigned to one cell and the resultant speech quality. The trade-off can be improved only by employing space-diversity techniques, which involve combining the signals from more than one antenna. But these techniques add significant complexity to the mobile units, and are very awkward to implement on hand-held mobile units;

(3) As the mobile moves from cell to cell, it is necessary to assign a new channel frequency to it. Thus, the central processor is required to keep track of the location of each mobile unit and of the assignment of each channel, and to issue instructions for changing channels via a dedicated control channel. This adds immensely to the complexity of both central plant and mobile units;

(4) If the mobile moves into a cell in which all assigned channels are occupied, its call will be terminated;

(5) FM channels are unsuitable for the reliable transmission of digital data. Hence the proposed cellular/FM system lacks flexibility with respect to possible new applications; and (6) Because each user has essentially the same apparatus, eavesdropping is possible and message privacy is lost.

Hence, while mobile radio service is now provided, improvements therein have been needed to enable greater satisfactory use of such service, particularly in providing adequate area coverage and in providing more efficient use of the available frequency spectrum. In addition, while improvements such as cellular communications within a service area have heretofore been proposed, such proposals are not fully satisfactory in solving many of the problems presented and/or create new problems.

SUMMARY OF THE INVENTION

This invention provides a novel apparatus and method utilizing a spread spectrum that is particularly useful for cellular mobile communication systems. The apparatus and method of this invention provides reliable, high quality transmission of speech and of digital data to and from mobile radio users, and is particularly useful in areas where the demand for such services is heavy (such as in large cities, for example). The apparatus and method of this invention makes efficient use of the available band of frequencies to enable high geographic user density while eliminating operational disadvantages present or contemplated in utilizing now known or proposed systems, and the apparatus and method is also sufficiently versatile so as to meet a wide variety of now contemplated future requirements and/or applications.

It is therefore an object of this invention to provide a novel communication system utilizing a spread spectrum.

It is another object of this invention to provide a novel communication system for cellular mobile communication systems.

It is still another object of this invention to provide a novel cellular mobile communication system utilizing a spread spectrum.

It is still another object of this invention to provide a novel apparatus and method utilizing a spread spectrum.

It is yet another object of this invention to provide a novel apparatus and method utilizing a spread spectrum in a cellular mobile communication system.

It is still another object of this invention to provide a novel apparatus and method that provides reliable high quality transmission of speech and of digital data to and from mobile radio users.

It is still another object of this invention to provide a novel apparatus and method that makes efficient use of the available band of frequencies to enable high geographic user density.

It is still another object of this invention to provide a novel apparatus and method that eliminates operational disadvantages of now known or proposed systems.

It is still another object of this invention to provide a novel apparatus and method that is versatile.

With these and other objects in view, which will become apparent to one skilled in the art as the description proceeds, this invention resides in the novel construction, combination, and arrangement of parts substantially as hereinafter described, and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate complete embodiment of the invention according to the best mode so far devised for the practicel application of the principles thereof, and in which.

DESCRIPTION OF THE INVENTION

Figure 1:
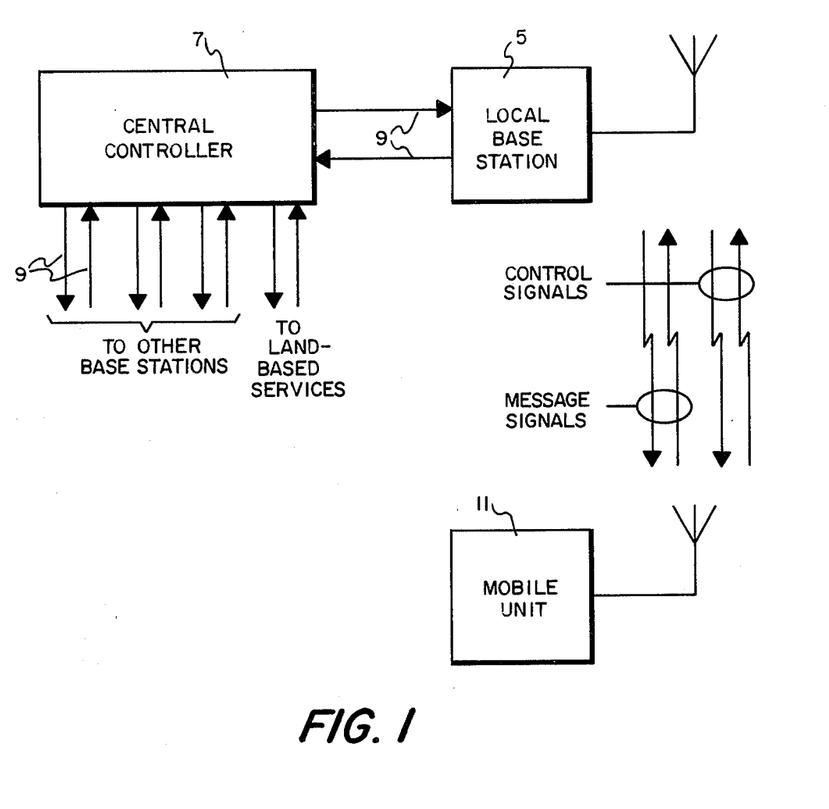
FIG. 1 is a simplified block diagram of the overall system of this invention.

For this invention, a hexagonal cellular structure is preferably utilized, with a base station (generally designated 5 in FIG. 1) at the center of each hexagon. The base station antenna may be omnidirectional or directional as desired, depending upon the traffic density. The size of the cells can be adjusted as demand for the service grows. A central processor, or controller, 7 provides message links via land lines (or other non-broadcast means, such as optical fiber link or microwave link), generally designated 9 in FIG. 1, to and from each base station (and to and from any other land based services as indicated in FIG. 1). The processor thus acts as a telephone exchange and performs all system supervisory functions. As also shown in FIG. 1, each base station 5 communicates with the mobile units (generally designated 11) within the cell of that particular base station.

The available band of frequencies is divided into two portions. One portion carries the downstream (base-station-to-mobile) messages, including one dedicated channel per cell reserved for control and supervisory purposes. The other portion of the band carries the upstream (mobile-to-base station) messages, including one dedicated channel per cell for call initiation and cell-to-cell handoff.

These two frequency bands may simply be two separate assignments, not necessarily contiguous or even continuous; or they may be subdivided and interleaved (which may improve the performance of the power control system, which relies on reciprocity between upstream and downstream channels).

Each channel used to convey information in the system is defined by a small subset of a large spread spectrum signal set. The spread spectrum signal set is sufficiently large that a permanent, unique channel assignment can be made to each user in a city, even if there are millions of users. Each channel occupies the entire width of the available (upstream or downstream) band, though its spectrum need not be continuous over the band. Energy from each user overlaps energy from all other users both in the time and frequency domains. Each user recognizes, or responds to, only its own assigned signal subset, separatingg it from the other signals by means of its unique demodulator structure. No attempt is made to synchronize signals from one user to another, and the signals need not be periodic.

The functions performed by the central processor are as follows:

1. Transmit from each base station a locally unique spread-spectrum signal for use as a power control and vehicle locator beacon. This defines the downstream control channel;

2. Initiate downstream calls via the downstream control channel;

3. Respond to upstream initiation requests via the upstream control channel;

4. Keep a record of the location of all active mobile units;

5. Route each call to and from the appropriate base station and/or land-based installation using the system;

6. Respond to cell-change requests, via the upstream control channel, by re-routing the message; and 7. Keep records of calls for logging and billing purposes.

These functions can all be performed by a high speed digital computer equipped with appropriate software and peripheral hardware.

Because of the spectral energy overlap between all the signals, it is essential that all signals from a given cell arrive at the receiver input with equal power. In the downstream case, this follows automatically if all signals are transmitted with equal power since they all pass through the same channel.

Figure 2:
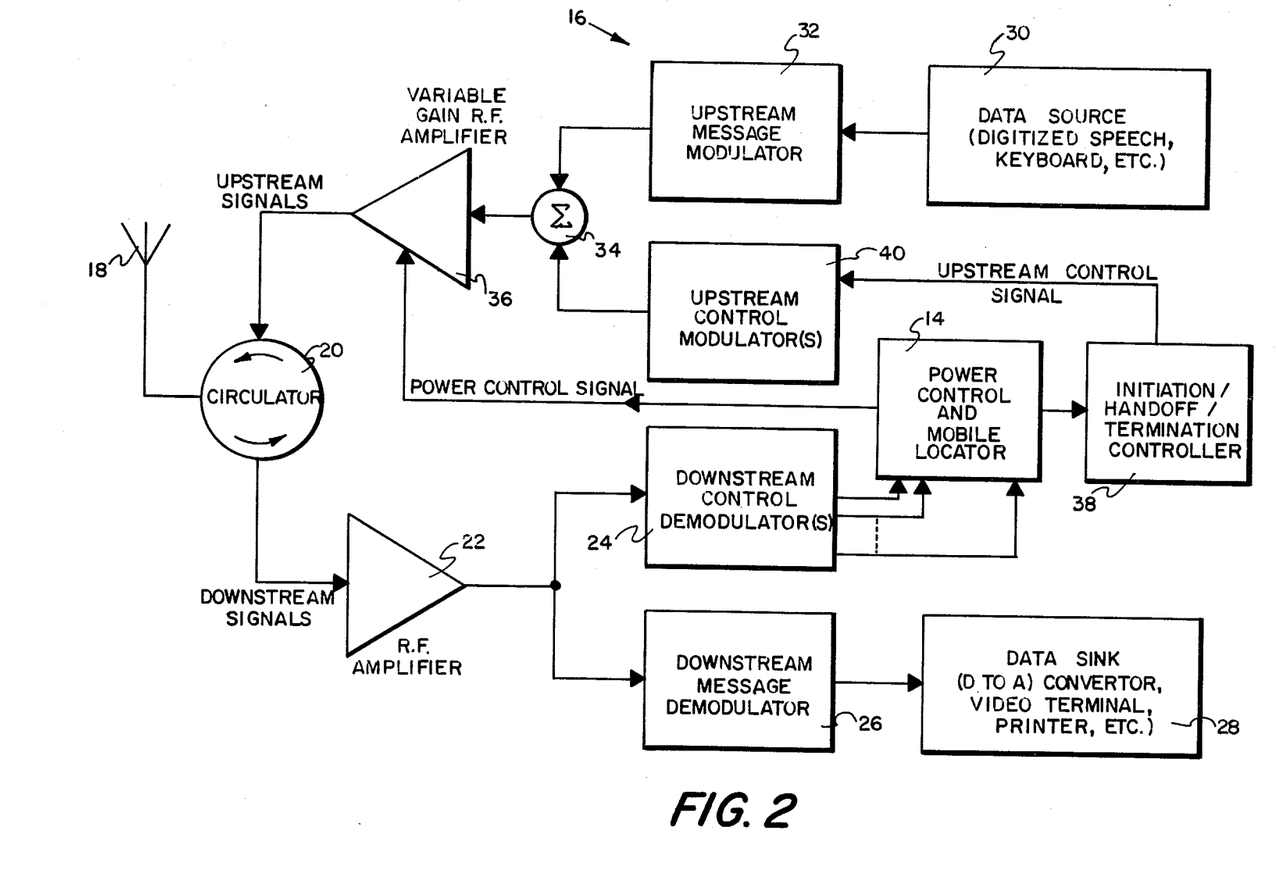
FIG. 2 is a simplified block diagram of a mobile unit having this invention incorporated therein.

Upstream signals are maintained at equal power (measured at the base station) by means of a power control system 14 built into each receiver 16 of each mobile unit 11 (see FIG. 2). The mobile unit 11 monitors the downstream control signal from its local base station 5. As shown in FIG. 2, this is accomplished by receiving the incoming signal on antenna 18 and coupling the same through circulator 20 and RF amplifier 22 to downstream control demodulator 24. Power control system 14 estimates the mean power and controls the transmitted power so that the product of control signal power and transmitted power is a constant. The time-constant of the control circuit is chosen so that at normal vehicular speeds, the power control system compensates for shadow fading but not for Rayleigh fading.

As shown in FIG. 2, the output from RF amplifier 22 is also coupled through downstream message demodulator 26 to data sink 28, while data source 30 provides data to upstream message modulator 32, the output of which is coupled through summation circuit 34 and variable gain RF amplifier 36 to circulator 20. As shown, the power control signal from power controller 14 is coupled to amplifier 36.

The mobile unit also monitors the received power from all the other nearby base stations, and makes a decision periodically as to which cell it most probably is in. If the current decision is different from its predecessor, the mobile unit initiates a cell transfer request from power controller and mobile locator 14 via the upstream control channel through initiation/handoff/termination controller 38 and upstream control modulator 40.

Basing the location decision of field strength measurements is unlikely to yield geographically accurate results, but it does give the strongest possible signal at all times. Hence the vehicle locator system acts like a selection diversity device.

Thus, message signals are uniquely assigned to each user, and can contain digitized speech or digital data, while control signals are locally unique to one base station but may be re-used at a suitable distance. Downstream signals may be transmitted constantly with strength used to control mobile power and in locator decision, and digital information used for call initiation, hand-off and termination, on a time-shared basis. Upstream signals may be digital information on a time-shared basis used for call initiation, hand-off and termination, and are transmitted only when these functions are required.

Attention is invited to the following references by Cooper, G. R. and Nettletion, R. W., related to this invention: Cooper, G. R. and Nettletion, R. W., "A spread spectrum technique for high capacity mobile communications", Record of the IEEE Conference of Vehicular Technology, March 1977; Cooper, G. R. and Nettletion, R. W., "Efficient Spectrum Utilization with Wideband Signals," Technical Report TR-EE 77-12, Purdue University, published March 1977; Nettleton, R. W. and Cooper, G. R., "Mutual Interference in Cellular LMR Systems: Narrowband and Broadband Techniques Compared", Record of MIDCON/77, IEEE, November 1977; and Nettleton, R. W. and Cooper, G. R., "Error Performance of a Spread-Spectrum Mobile Communications System in a Rapidly-Fading Environment", Record of the National Telecommunications Conference, IEEE, December 1977.

The spread-spectrum signal set of this invention is a time-frequency coded (TFC) signal set that is essentially a set of frequency-hopped carriers designed to possess certain favorable properties.

The construction of the signal set is in three stages.

First, a small set of long-duration time-frequency coded signals are generated algorithmically. This forms the basic signal set. Second, each signal of the basic signal set is divided into several shorter signals. This subdivision retains the same properties as the basic signal set, but provides a much larger set. Each signal thus produced defines a channel; i.e., each signal is uniquely assigned to one user only in the service area. Third, the message data is imprinted on each signal by means of differential biphase modulation. Thus the signals act as frequencyhopped carriers for differentially modulated information.

The basic signal set is a set of sinusoidal, constantenvelope, continuous-phase signals of duration $T_1$ seconds. Each signal is divided into m time-chips of duration $t_1 = T_1/m$ seconds. The frequency of each signal is constant for the duration of each time chip, but is different from time chip to time chip. No frequency is repeated in any one waveform during $T_1$ seconds.

Figure 3:
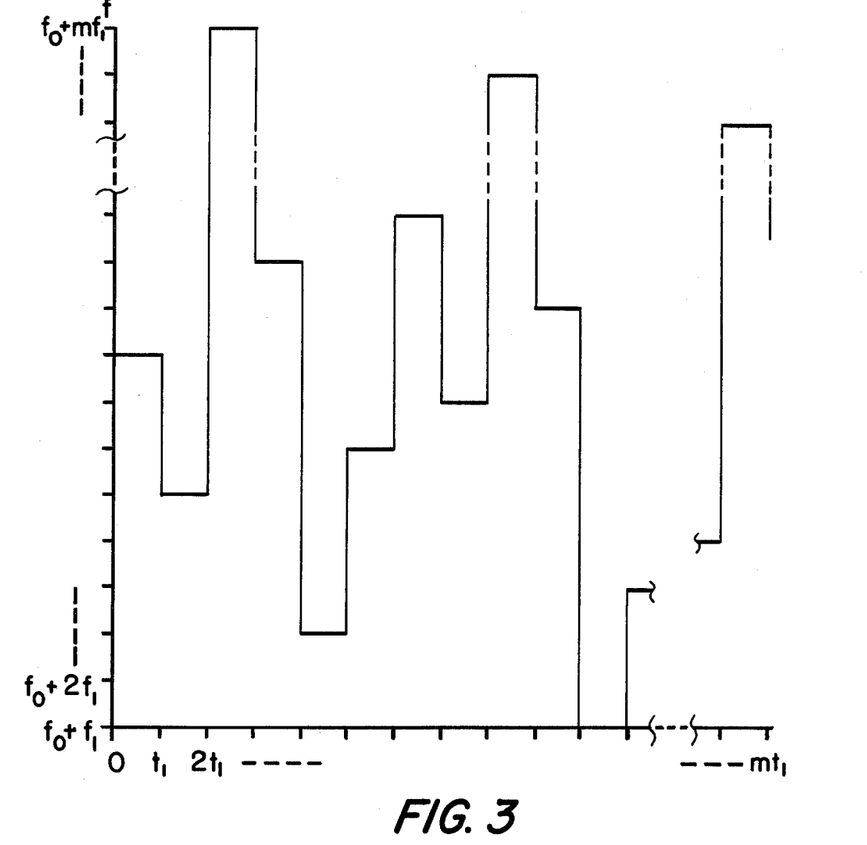
FIG. 3 is a representative time frequency coded waveform.

The frequency assignments are of the form $$f_i^k = f_o + a_i^k f_1$$

where $f_i^k$ is the frequency shift (from some nominal frequency $f_0$) assigned to the ith time chip of the kth signal, and $a_i^k$ is the ith integer of the kth code in the one-coincidence code set. Hence there are m distinct signal waveforms, each with m time chips, and each with a bandwidth of approximately $mf_1$. (The $a_i^k$ are permuted from the set of integers $(1,2,3,\ldots,m)$. FIG. 3 shows a representative signal in the time-frequency plane.

The code sequences $S^K = (a_1^K, a_2^K, a_3^K, \ldots, a_m^K)$, $K = 1, 2, \ldots, m$, are all permutations of the integar set $(1, 2, 3, \ldots, m)$. Since there are m! such permutations, it is not immediately obvious how one goes about selecting the m "best" permutations from the m! possibilities, or indeed why there should only be m such codes. For a more complete discussion of the theory of construction of the codes, attention is directed to G. R. Cooper and R. D. Yates, "Design of Large Signal Sets with Good Aperiodic Correlation Properties," Purdue University, TR-EE-66-13, September 1966. By contrast, however, the method of actually generating such codes is simple and algorithmic, thus:

1. Select a prime number p. (The selection criteria will become obvious in a later section). Then $m = p - 1$;

2. From the smallest primitive root, b, of p generate the permutation vector II;

$$\pi_p = \{1, (b), (b^2), \ldots, (b^{m-1})\}$$

where the operation $(B^j)$ denotes the module-p-reduced, jth power of b; i.e., $(x) = x - [x/p]p$ where $[y]$ denotes the largest integer $\leq y$;

3. Select an arbitrary starting permutation $S^1$;

4. Operate on $S^1$ with $\pi_p$ $(m-1)$ times to form the m code sequences. The operation $$S^j = \pi_p S^{j-1}$$

means $$a_j{}^{l-1} = a_b{}^j$$

$$a_b{}^{j-1} = a_b{}^{j_2}$$

$$a_{bm-1}{}^{j-1} = a_1{}^j$$

The mth permutation operation regenerates the original starting vector $S^1$ and the sequence of codes is periodic thereafter. Hence there are m distinct sequences.

The foregoing is illustrated with a simple example. Let p=7. Then b−3, l and $\pi_7$=(1, 3, 2, 6, 4, 5). Select, say, the starting vector $$S^1 = (1, 2, 3, 4, 5, 6)$$

$$S^2 = (5, 3, 1, 6, 4, 2)$$

$$S^3 = (4, 1, 5, 2, 6, 3)$$

$$S^4 = (6, 5, 4, 3, 2, 1)$$

$$S^5 = (2, 4, 6, 1, 3, 5)$$

$$S^6 = (3, 6, 2, 5, 1, 4)$$

and finally back to $S^1 = (1, 2, 3, 4, 5, 6)$ . . . and so on.

The example also serves to illustrate most of the following general properties of the TFC signal sets:

If the codes are synchronized and if $f_1t_1 = K$, where k is any integer, the signals are all mutually orthogonal. That is, no number is repeated in any column of the above code set. Generally the condition $f_1t_1 = 1$ would hold for orthogonality, since $f_1t_1 > 1$ produces a spectrally inefficient set.

If synchronization is not employed, no two signals have more than one frequency coincidence for any time shift. This is referred to as the one-coincidence property and may be verified by shifting any row in the above code set to the right or left. The one-coincidence property is the design feature which is responsible for the uniformly-small aperiodic cross-correlation property of the TFC signal set. The envelope of the normalized cross-correlation function for the one-coincidence sets, $V_{ij}(\tau)/E$, has been shown to have the following upper and lower bounds—

$$\frac{1}{m\sqrt{f_1t_1}} \leq \frac{V_{jk}(\tau)}{E} \leq \sqrt{\frac{\ln(m)}{\frac{m}{2}(f_1t_1 m + 1)}}$$

for $\frac{1}{m} \leq f_1t_1 \leq 1$.

Figure 5:
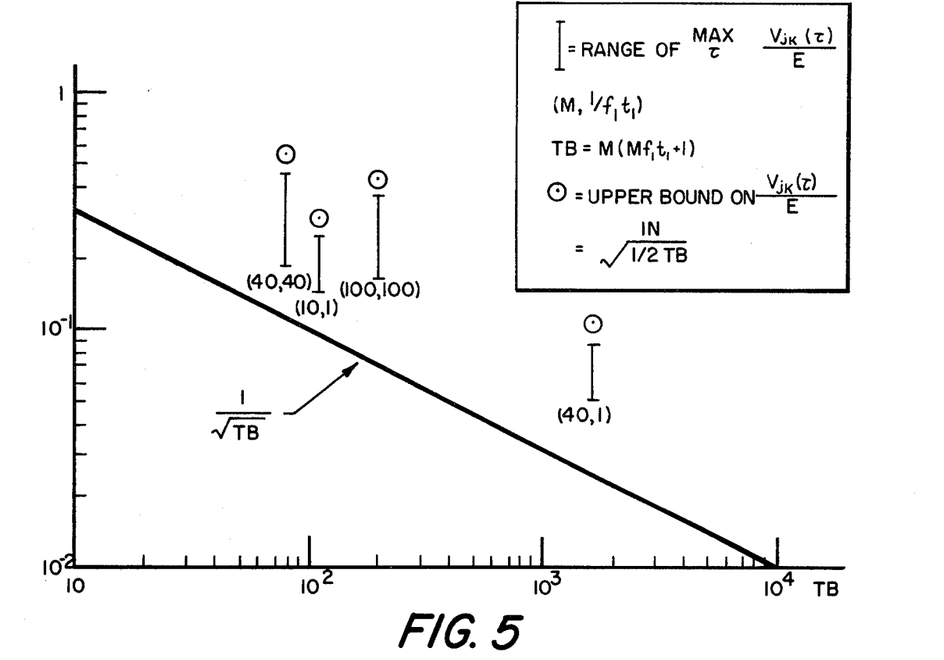
FIG. 5 is a graph showing the summary of cross-correlation properties of sets.

This property permits a number of users to transmit independent, unsynchronized signals with minimal mutual interference, provided that all signals are received with equal power. FIG. 5 shows the spread of experimental data in relation to the above bounds, from computer simulations of the system. Note that performance is generally better for the orthogonal ($f_1t_1 = 1$) codes, as one would expect. The data was generated from codes in which the starting vector was the permutation operator itself.

The signal waveforms from the undivided signal set have approximately uniform spectra with bandwidth $\approx mf_1 + 1/t_1$.

The magnitudes of the cross-correlation envelopes set a limit on the number of units which may use the system simultaneously for a given performance criterion (output signal to noise ratio for speech, for example). The system does not, however, exhibit a blocking characteristic; if the limit is exceeded, the consequence will simply be a degradation in performance for each unit. Depending on the parameters chosen, the system might be substantially overloaded before communication becomes seriously impaired. This is the characteristic known as "graceful degradation under overload conditions."

The basic signal set may be split into shorter signals of length n (n<m) to generate a new set of (m/n)m signals ((x) denotes the largest integer equal to or less than x). In the new set, if the frequency slots do not overlap, i.e., if $f_1t_1 = 1$, each signal will be orthogonal to at least (m−1) other signals with synchronization, and to (m/n)−1 signals without synchronization. In either case, the one-coincidence property will still hold for all pairs of divided signals. The number of TFC signals generated by the sub-division process is proportional to $m^2$ (approx.) rather than m in the undivided case. Maximum efficiency occurs if n is an integer power of 2.

Figure 4:
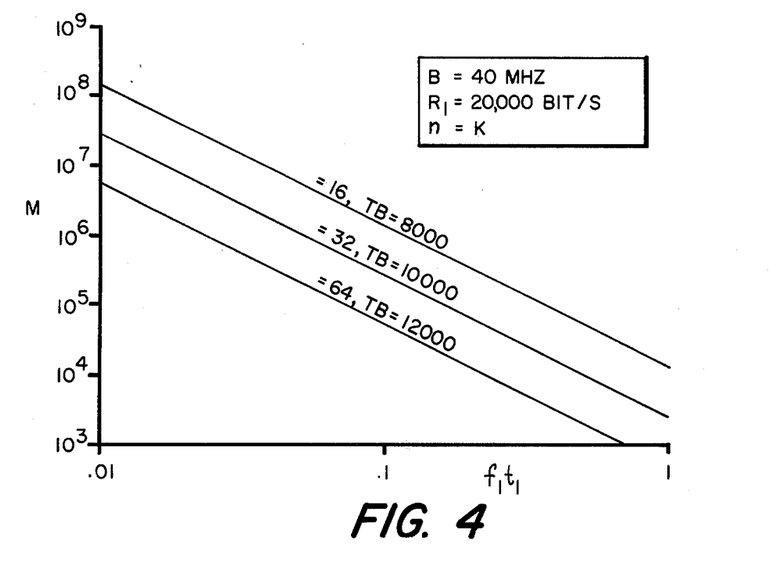
FIG. 4 is a graph showing the number of unique codes.

It is the divided TFC signal set that finds application in the mobile radio case. Specifically, it is anticipated that each mobile unit will be assigned one signal from the divided set, and will communicate by imprinting a biphase code onto the assigned waveform. Thus each user is both identified and addressed by the same unique signal. This assures both RADA (random access, discrete address) and privacy capabilities as an integral part of the system design. With p in the hundreds, some tens of thousands of unique codes may be generated. For example, suppose this is a system with an available bandwidth of 40 MHz and each user requires a bit rate of 20 kbit/s. FIG. 4 shows the number of unique codes, M, versus $f_1t_1$.

Note that in the divided signal set case, the signal spectrum from each unit is not expected to be either continuous or uniform. Rather each signal will have n narrow band spectral components distributed quasi-randomly over the band with a frequency spacing (as an average) of B/n where B is the total available bandwidth for the system.

The signal waveforms from the previous stage may each be used as frequency-hopped "carriers" for a biphase (or multiphase) coded message, thus:

$$s^k(t) = c_1{}^k(t)\sqrt{2S}\cos 2\pi(f_o + a_1{}^k f_1 + \theta_1), 0 < t < t_1$$

$$= c_2{}^k(t)\sqrt{2S}\cos 2\pi(f_o + a_2{}^k f_1 + \theta_2), t_1 < t < 2t_1$$

$$\vdots$$

$$= c_n{}^k(t)\sqrt{2S}\cos 2\pi(f_o + a_n{}^k f_1 + \theta_n), (n-1)t_1 < t < nt_1$$

where $c_i{}^k(t) = \pm 1$ are constant for a given waveform period and represent the transmitted message; and S represents the power of the signal. The $\phi_i$ are the phase constants needed to give the signal its "continuous-phase" property; i.e., to ensure that the waveform "chips" will "join at the edges." They are not needed (i.e., they are all zero) if $f_o + f_1 t_1 = k$ for k some integer, since this guarantees that each chip will contain an integer number of cycles.

The signal subset of the third stage assigned to each user is an "alphabet" of $2^n$ distinct phase-modulated versions of the user's designated frequency sequence. If orthogonal coding is used, each waveform transmitted will contain $\log_2 n$ bits of message information.

The signal received either by or from a mobile unit will arrive at the receiver antenna via a large number of paths. Hence the received signal has a coherence bandwidth typically of the order of magnitude of 30 kHz. Phase coherence between frequency slots is therefore lost entirely in the channel. Further, the received electromagnetic field near the antenna has a coherence distance of about one-half wave-length, so that a moving mobile unit will encounter loss of phase coherence in each frequency slot in a very short time.

To overcome this difficulty, a differentially coherent biphase coding scheme is utilized. The phase of each time chip is compared with the phase of the corresponding time chip in the previous waveform to provide the channel information bit contained in that chip. If $b_i^k = \pm 1$ is the ith channel bit for the kth transmitted waveform, then $$c_i^k = c_i^{k-1} \text{ if } b_i^k = 1$$
$$= -c_i^{k-1} \text{ if } b_i^k = -1$$

The channel signal alphabet has n distinct elements, chosen as the rows of the nth order Hadamard matrix $H = (h_{ji})$. If the kth transmitted waveform conveys message element j, then $$b_i^k = h_{ji}.$$

Since there are n distinct channel message elements, they convey $\log_2 n$ message bits.

The time-frequency coded waveforms described above represent only one of a wide variety of similar waveforms possible. The demodulator described next can be used with the TFC signal set described above, or with any other time-frequency codes which may arise in the future, provided that the message information is imprinted by the differential bi-phase modulation method just described.

The operations performed on the incoming TFC signal by the message demodulator are as follows:

(1) The signal is delayed in integer multiples of $t_1$ up to a maximum of $(2n-1)t_1$. Thus there are 2n separate delayed versions of the signal available in the demodulator;

(2) Bandpass filters select the appropriate frequency bands from the delayed signals, in the reverse order of the frequency sequence of the desired signal. Hence the first frequency is selected at delay points $(2n-1)$ and $(n-1)t_1$; the second at $(2n-2)t_1$ and $(n-2)t_1$; and so on, with the last frequency selected at $nt_1$ and zero delay (the filtering process may be performed either before, during or after the delay process). Operations (1) and (2) realign the time chips of the two most recent incoming signal waveforms, so that all 2n of them appear at a set of terminals simultaneously;

(3) Each pair of the delayed signals of the same frequency is multiplied together, then low-pass filtered to remove the double frequency component. This operation compares the phases of corresponding time chips in the two most recent signals. Each low-pass filter output will be positive if the phases are the same (or differing by less than $\pm \pi/2$ radians) and will be negative if the phases are opposing (or differing by greater than $\pm \pi/2$ radians);

(4) A threshold detector examines the sum of the absolute values of the output of operation (3) and closes a set of n analog gates (sampling switches) when the sum exceeds a specified threshold value. The sampling switches then transfer the n signals to operation (5);

(5) Let the n sampled signals from operation (4) be the ordered elements of a vector $\underline{q}$. Let $\underline{H}$ be the nth order Hadamard matrix. Then $$\underline{Q} = \underline{H}\underline{q}$$

describes operation (5), a diagonalizing operation. $\underline{Q}$ is the n vector of output signals. In the absence of noise and fading, $\underline{Q}$ will have only one nonzero element, corresponding to the transmitted signal. Generally, $\underline{Q}$ will have no nonzero elements, but the most probable location of the most positive element will still correspond to the transmitted message. Because each element of the vector $\underline{Q}$ contains energy from all elements of the vector $\underline{q}$, the linear combiner operation provides the receiver with a high level of frequency diversity. It is for this reason that the demodulation error performance is nearly as good in a dispersively fading channel as it is in a linear channel. Also for this reason, the performance of the receiver increases significantly with increasing n (the inventors have determined that $n \geq 32$ is necessary for good performance in the presence of fading); and (6) The elements of the vector $\underline{Q}$ are scanned to identify the most positive element. This element is then declared to correspond to the transmitted message. Operation (6) produces a maximum-likelihood estimate of the transmitted message. The estimated message may be expressed in binary form, or any other form compatible with the requirements of the data sink.

Figure 6:
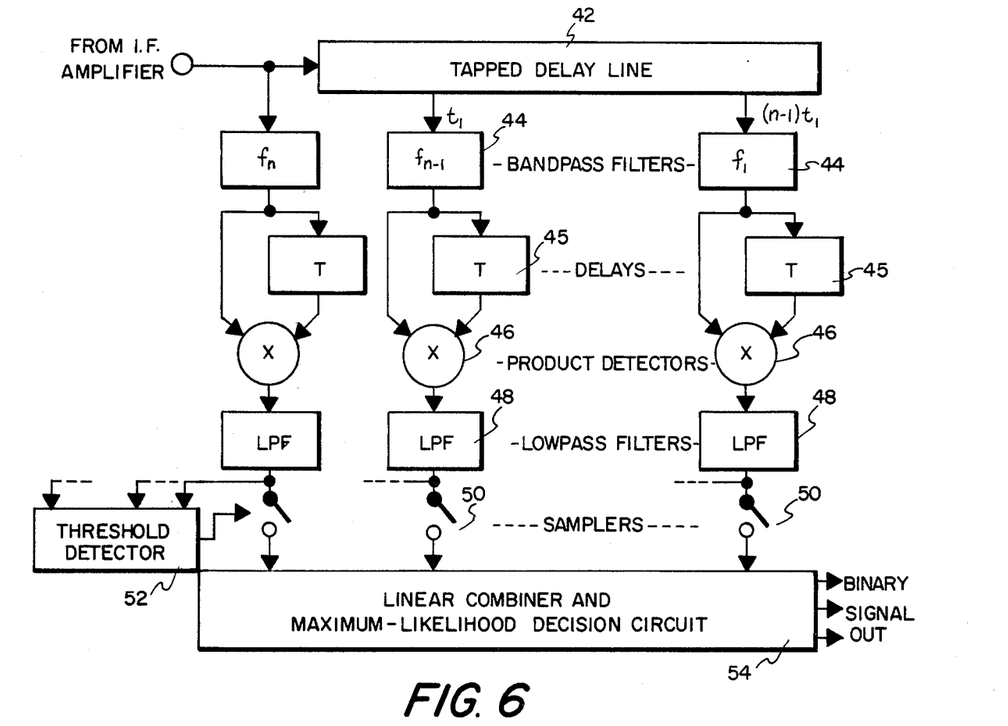
FIG. 6 is a received demodulator that may be utilized in this invention.
Figure 7:
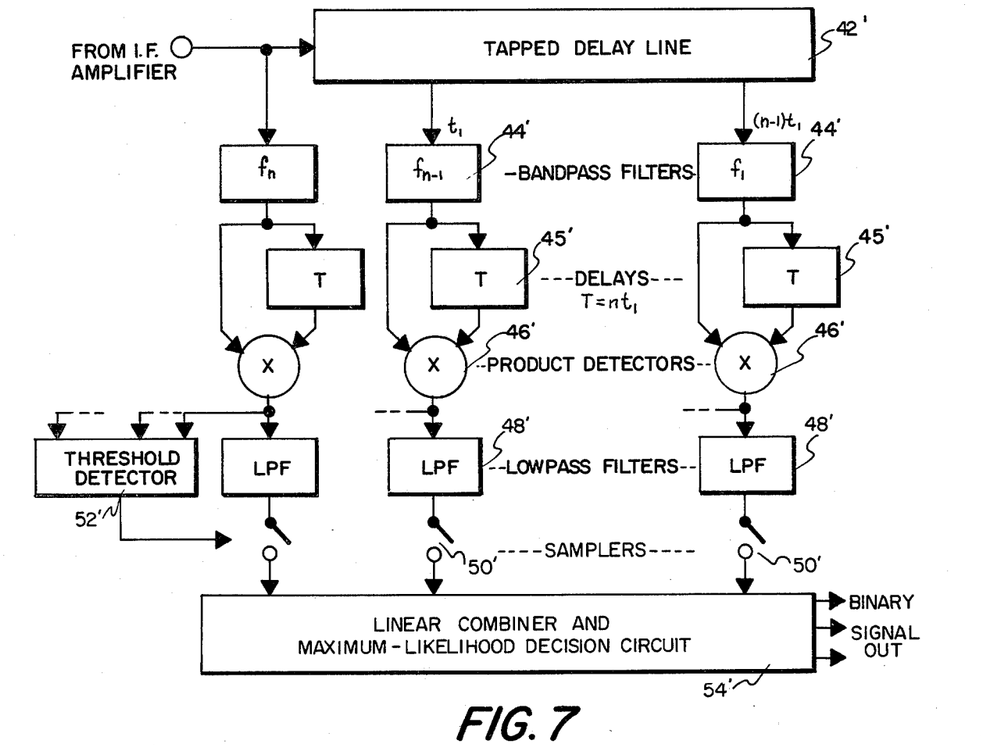
FIG. 7 is an alternate embodiment of a received demodulator that can be utilized in this invention.

FIGS. 6 and 7 show a number of ways in which the above sequence of operations can be performed. As shown, tapped delay line 42 (FIG. 6) and $42^1$ (FIG. 7) receive the signals and couple the same through band pass filters (generally designated 44 in FIG. 6) or through band pass filters and delays (generally designated $44^1$ and $45^1$ in FIG. 7) to product detectors 46 (FIG. 6) and $46^1$ (FIG. 7). The outputs from the detectors are coupled through low pass filters 48 (FIG. 6) and $48^1$ (FIG. 7) and through sampling switches 50 (FIG. 6) and $50^1$ (FIG. 7) controlled by threshold detectors 52 (FIG. 6) and $52^1$ (FIG. 7) to linear combiner and maximum-likelihood decision circuits 54 (FIG. 6) and $54^1$ (FIG. 7).

The basic TFC signal receiver can be broken into two major components. The frontend-demodulator unit (see FIGS. 9-11) takes the received radio frequency TFC signal and demodulates the information contained in the 2n time chips of two adjacent waveforms. The decoder-decision circuit (see FIG. 8) takes the received information from the frontend-demodulator and decides if the signal received is the desired signal. If the proper signal is received, the decoder-decision circuit decodes the received signal as a member of the code alphabet. The output data corresponding to the code alphabet entry is then delivered as output of the TFC message demodulator.

This basic receiver structure is used in all receiver applications in the TFC spread spectrum cellular land mobile system, such as message signal and control signal reception.

Each output of the frontend-demodulator circuit is a member of r. Each output is a demodulated differential-phase-shift-keyed sinusoidal pulse from the TFC signal. The n sinusoidal pulses that make up the TFC signal are delayed by appropriate amounts so that they are demodulated at the same time. The delayed demodulated sinusoidal pulses all arrive at the output at the same time.

The decoder-decision circuit takes the vector r, the demodulated time coincident TFC signal and compares it to each of the $c^j$. A decision is made as to which of the $c^j$ is "most similar" to the received r. The output data corresponding to the chosen code alphabet entry $c^j$ is then delivered as output.

Since a decoder-decision circuit is common to all versions of the TFC signal demodulator, regardless of the type of frontend used, it is discussed first.

Figure 8:
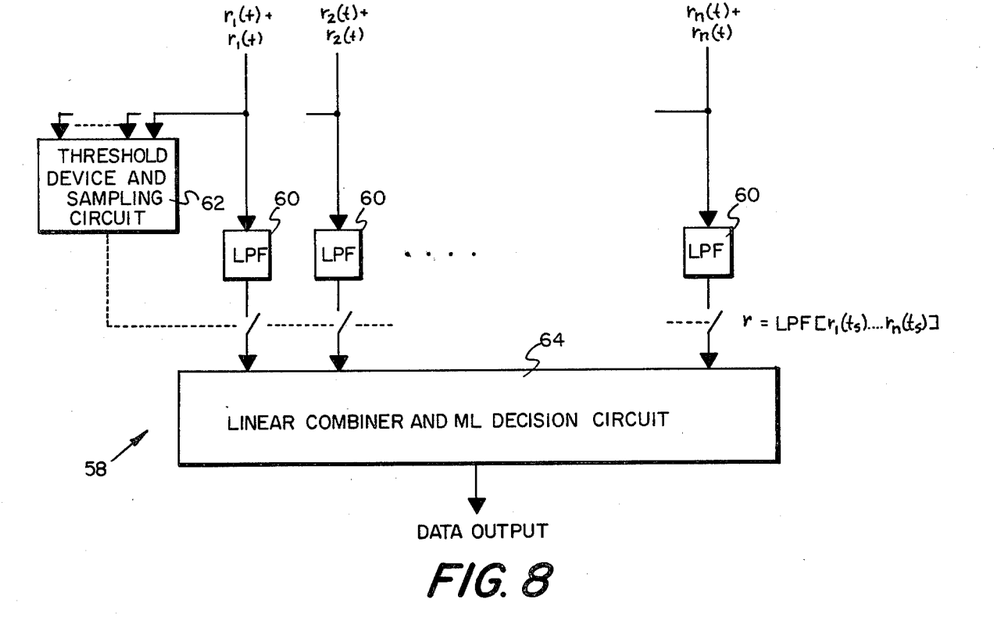
FIG. 8 is a block diagram of a decoder decision circuit that can be utilized in this invention.

As shown in FIG. 8, the decoder-decision circuit 58 consists of low-pass filters 60, a threshold device and sampling circuit 62, and a linear combiner and maximum likelihood decision circuit 64.

The threshold device compares the $$\sum_{i=1}^{n} |r_i(t) + n_i(t)|$$

to a threshold level. If the $$\sum_{i=1}^{n} |r_i(t) + n_i(t)|$$

exceeds the threshold level, the signal is sampled and $\hat{r}$ is input to the linear combiner and ML decision circuit. The ith element of $\hat{r}$ is the low pass filtered $r_i(t) + n_i(t)$. The choice of the output is made by maximum likelihood comparison between $\hat{r}$ and $c^j$. The $c^j$ most similar to the r is chosen. The linear combiner and maximum likelihood decision circuit pick the most positive $$r \, c^j, \, j = 1, 2, \ldots, n.$$

This operation could be performed by either dedicated hardware or by a software based microprocessor system.

Figure 9:
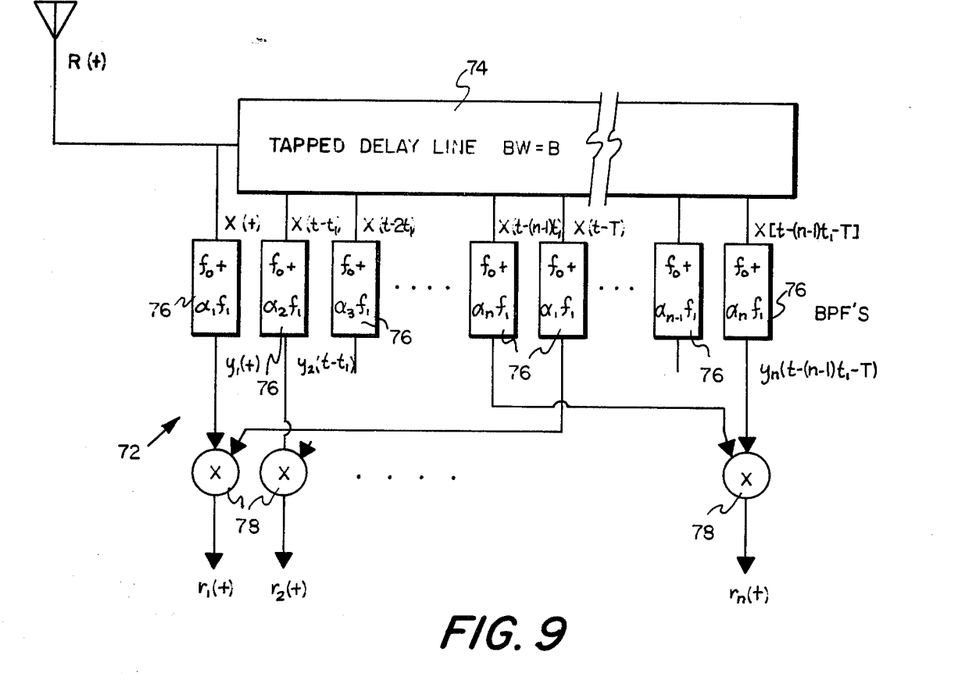
FIGS. 9, 10 and 11 are block diagrams of alternate embodiments of the front end of the demodulator that can be used in this invention.
Figure 10:
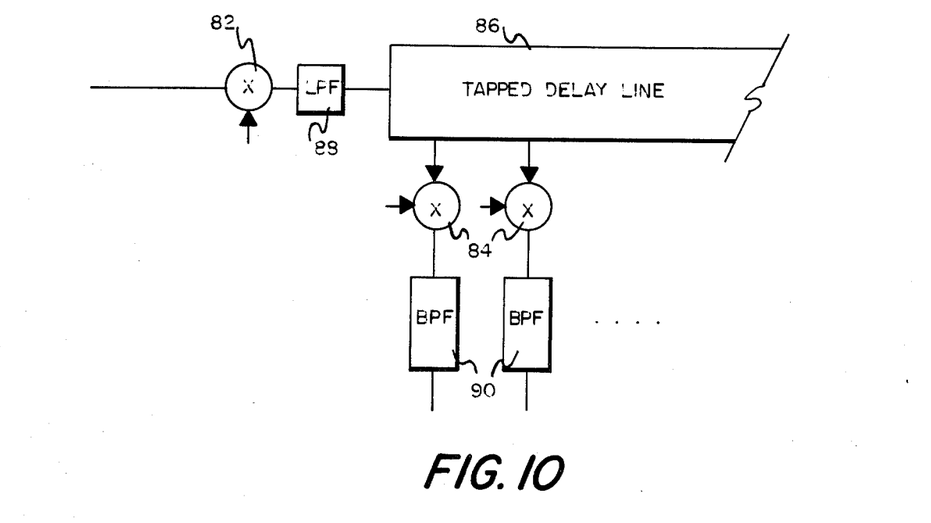
Figure 11:
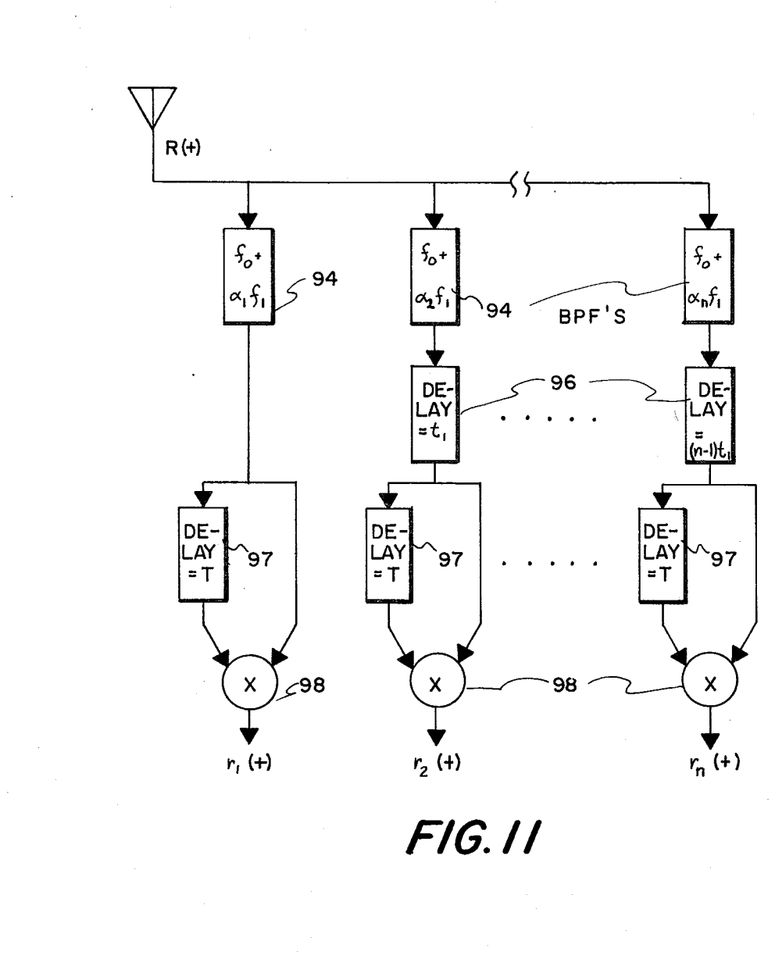

The frontend-demodulator circuit can take many forms, such as, for example, as shown in FIGS. 9 through 11, with the embodiment shown in FIGS. 10 and 11 being claimed in the separate application of George R. Cooper, Raymond W. Nettleton and David P. Grybos. The basic components are bandpass filters and delay lines arranged in various configurations. The center frequencies of the bandpass filters correspond to the frequencies of the n carrier bursts that make up the TFC signal. The selection of these center frequencies to correspond to a particular signal in the signal set uniquely determine the coding and address of the receiver. Bandpass filters should be of suitable design to facilitate a change in center frequency. This allows one general receiver to be coded to receive any signal in the signal set.

The delay lines must be able to delay an analog signal by an amount $nt_1$, where n is determined by the application of the delay line in the receiver and $t_1$ is the duration of one chip. The delay line bandwidth also depends on the delay line application in a particular receiver configuration. The bandwidth required is typically either at least B, the system bandwidth for the upstream or downstream channel, or the bandwidth of the bandpass filters.

The delays can be implemented by either pure analog components, sampled analog components, quantizers and digital components or any combination of these techniques.

The broadband delay frontend-demodulator 72, as shown in FIG. 9, consists of a tapped delay line 74, a set of bandpass filters 76 and a set of multipliers 78 to demodulate the differential phase modulation. The tapped delay line has bandwidth B and total time delay 2T. The spacing between taps correspond to a delay of $t_1$. The bandpass filters have center frequencies that correspond to the frequencies of the carrier bursts that make up the TFC signal assigned to the receiver. The jth multiplier has inputs of $y[t-(j-1)t_1-T]$ and $y[t-(j-1)t_1]$. The output $r_j(t)$ consists of a dc term that corresponds in part to the information encoded in the jth time chip of the TFC signal.

The delay may be realized by any of the aforementioned techniques as long as the technology utilized can produce a delay of 2T with bandwidth B and with taps corresponding to delays every $t_1$ seconds. The broadband delay has a time-bandwidth product of 2TB.

The broadband delay frontend-demodulator configuration may be modified as shown in FIG. 10 by the use of mixers 82 and 84 at the inputs and outputs, respectively, of the delay line 86 and bandpass filters 88 and 90 to suit the center frequency requirements of the delay line and filters.

Identical BPF's could be used if the local oscillators feeding the mixers are selected to translate the frequency of the ith chip into the BPF filter center frequency. The coding of the receiver is then done by adjusting the local oscillators instead of adjusting the BPF center frequencies.

The narrowband delay frontend-demodulator performs the bandpass operation before the delay lines and is shown in FIG. 11. As shown, filters 94 receive the input signals and couple the same through delays 96 and 97 to mixers 98. This allows the delay lines to have much smaller bandwidths than the delay line used in the wideband delay frontend-demodulator. The delays of T are now required to get $y[t-(j-1)t_1-T]$ as the second input to the multiplier.

This structure allows the use of components that are easier to construct. The narrowband version requires at least $2n-1$ narrowband delay lines of various delay times. Only one broadband delay line is required in the broadband delay frontend-demodulator. The narrowband delays require time-bandwidth products on the order of $2T/t_1$.

The basic narrowband delay frontend-demodulator could also be modified by the use of mixers at any point in the circuit. The mixers would be used to match the operating frequency requirements of the component devices.

The narrowband delays could be constructed using any technique capable of the required delay time and bandwidth. This structure is especially suited for the application of charge transfer devices and monolithic integrated circuits.

Figure 12:
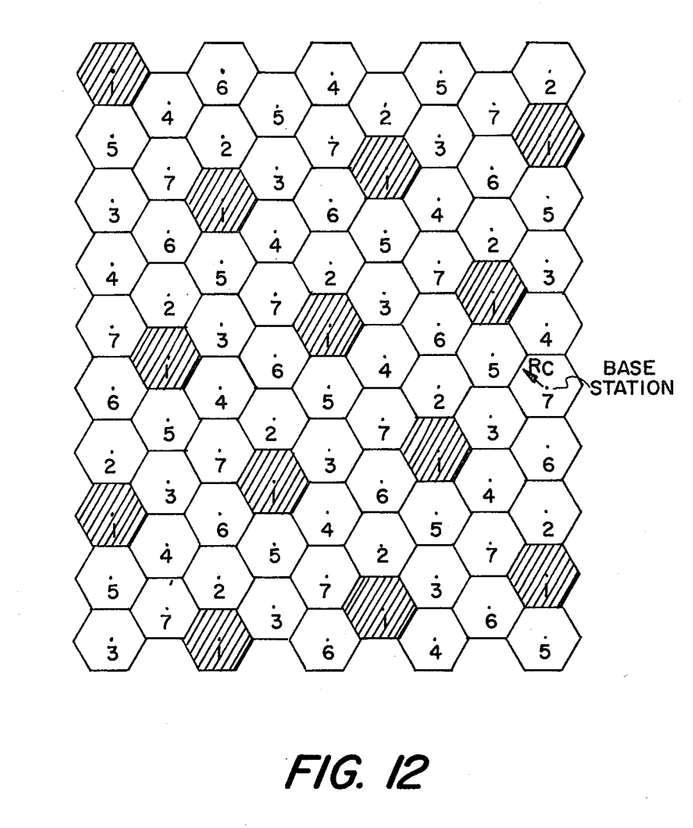
FIG. 12 is a representative cellular layout.

It is assumed that the base stations will each be assigned a locally unique TFC signal subset for use as the upstream and downstream control signals (UCS and DCS). Each base station transmits its signal periodically and with constant power with a relatively low pulse repetition frequency. The purpose of the low p.r.f. is to allow each radiated signal to clear the immediate area before the next base station transmits its signal. Hence the DCS of each nearby base station will appear at the input of every receiver at a different time to all the others. With p.r.f.'s of a few kilohertz, as few as seven distinct DCS frequency sequences allocated in the manner as shown in FIG. 12, will suffice to yield satisfactory operation of the power control/mobile locator system.

The operations performed by the power control/mobile locator system are as follows (let P be the number of distince signal subsets assigned to the base stations as DCS's):

(1) Each receiver contains P demodulators, each designed to receive one of the DCS's. The output of each demodulator is a scalar signal proportional in magnitude to the incoming power of its DCS;

(2) Each demodulator output signal is multiplied by a constant. The value of the constant is unity for the (P-1) signals which have not been selected as identifying the local base station; the remaining signal is multiplied by some constant greater than one. The purpose of this weighting technique is to introduce some "hysteresis" into the decision process. Hysteresis appears to be desirable in order to discourage vacillation of the locator decision when a mobile unit is near the border of its cell. A constant on the order of 1.5 has been found to give satisfactory results. However, this operation is generally to be regarded as optional;

(3) The signal identified as coming from the local base station is averaged over H samples, and the averaged signal is used to control the output power of the mobile transmitter. This may be done via a power control loop, a voltage controlled amplifier or attenuator or any other suitable means. The law governing the power control operation is that the product of DCS power and transmitted power must be a constant. The constant is determined as a system design parameter and is the same for all mobile units;

(4) Each weighted demodulator output signal is passed through a threshold detector which passes any signal to its output only if it exceeds a given threshold level. The P threshold circuits have the same threshold level. These signals are then averaged over K samples, after which the P averaged signals are passed via sampling switches to operation (5); and (5) The P averaged signals are scanned to determine the most positive signal, and that signal is declared to identify the local base station. This operation amounts to a maximum likelihood estimate of the nearest base station. The decision is passed back to the hysteresis circuit of operation (2) and to the averaging circuit of operation (3).

Figure 13:
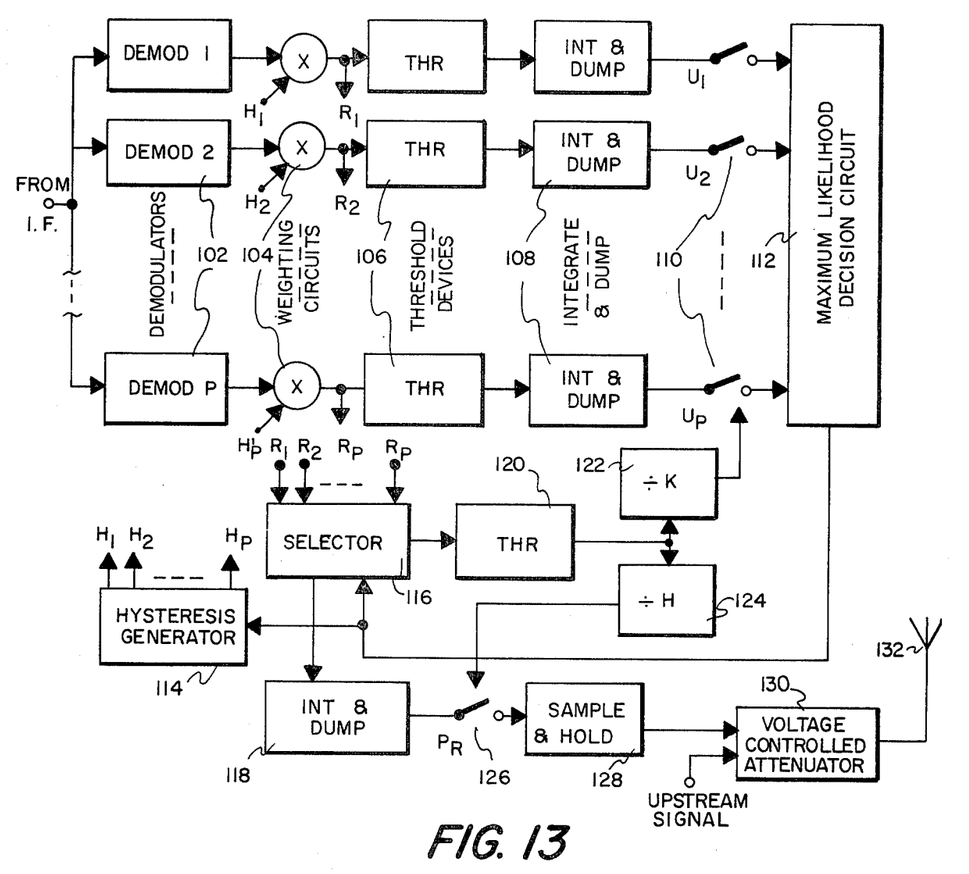
FIG. 13 is a block diagram of a power control/mobile locator system that can be utilized in this invention.

FIG. 13 shows a typical block diagram of the power control/mobile locator system. As shown, the input signals from the IF are coupled through parallel connected demodulators (generally designated 102), weighting circuits (generally designated 104), threshold devices (generally designated 106), integrate and dump circuits (generally designated 108), and switches (generally designated 110) to maximum-likelihood decision circuit 112. An output from maximum likelihood decision circuit 112 is coupled to hysteresis generator 114 (which supplies a second input to weighting circuits 104) and to selector 116 which supplies an output to integrate and dump circuit 118. Selector 116 also supplies an output through threshold circuit 120 to divide-by-k circuit 122 and divide-by-H circuit 124, which circuits control switches 110 and switch 126, respectively. When switch 120 is closed, an output is coupled from integrate and dump circuit 118 to sample and hold circuit 128, the output of which is coupled to voltage controlled attenuator 130 through which the upstream signal is coupled to antenna 132.

The demodulators may be constructed in a similar way to the message demodulator, except that it is necessary only to detect the presence of the signal and its magnitude for the power/mobile locator function. Hence the differential phase operation is not required in general. The operations performed by these simplified demodulators are as follows:

(1) The signal is delayed by integer multiples of $t_1$ up ro a maximum of $(n-1)t_1$. Hence there are n delayed versions of the signal (starting with zero delay) in each demodulator;

(2) Each delayed signal is bandpass filtered, with center frequency in reverse order of the assigned frequency sequence of the desired DCS. Thus the undelayed signal is filtered at $f_n$, and so on, with the $(n-1)t_1$ delayed signal filtered a $f_1$. Operations (1) and (2) align the time chips of the signal so that they all appear at the output of the filters simultaneously, and operations (1) and (2) may be reversed in order if desired; and (3) The filtered and delayed signals are each squared, lowpass filtered to remove the double frequency component and then summed. The output from the summer is therefore proportional to the sum of the squares of the amplitudes of each time-chip component in the selected DCS; i.e., it is an estimate of mean received DCS power. The estimate is already averaged over n independent samples because the statistics of each frequency slot are independent in the multipath channel; and the estimate can be improved further by the averaging operation (3) of the power control system.

Figure 14:
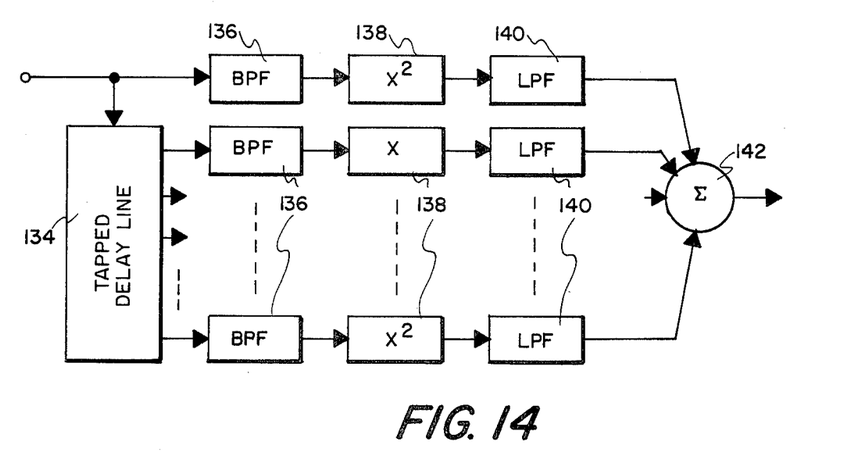
FIG. 14 is a block diagram of the demodulator shown in FIG. 13.

FIG. 14 shows a typical block diagram of a power control/mobile locator demodulator. As shown, the input signal is coupled through tapped delay line 134 to parallel circuits each including a bandpass filter 136, squaring circuit 138, and lowpass filter 140, after which the signals are summed at summation circuit 142.

Downstream control signal data will be required for call initiation/termination/handoff operations. This may be differentially phase modulated onto the DCS as described in the spread spectrum signal set description. If this is done, it will be necessary to substitute a message demodulator for the simplified demodulator (just described) corresponding to the local station. This may be done electronically in response to the mobile locator decision, or (if economically feasible) all the demodulators may be of the message type. Probably the most obvious method is to electronically convert the "local" demodulator, when it is identified, from the "simplified" type to the "message" type.

The power control/vehicle locator signal may be taken from the input to the threshold detector summing circuit of the DCS message demodulator.

An alternative implementation of the power control/mobile locator system, requiring only one modulator and one DEC waveform, could be implemented if biphase coding is used to identify the base stations instead of a group of different codes. In that case, the following modifications of the system just described are required:

(1) Each base station emits a DCS, on which biphase information is modulated to identify it in a local sense. These emissions are timed such that they cannot coincide in time in the receiver of any mobile unit from nearby base stations;

(2) A simple differentially-coherent demodulator as described under "TFC Message Demodulator" is used to extract the binary information in the DCS. (Not all bits in waveform need be used for identification; any remaining bits can be used for other control functions); and (3) A "pigeon-holing" operation routes the signal strength information to the appropriate averaging channel for the ML base-station decision, using the binary identification information.

Figure 15:
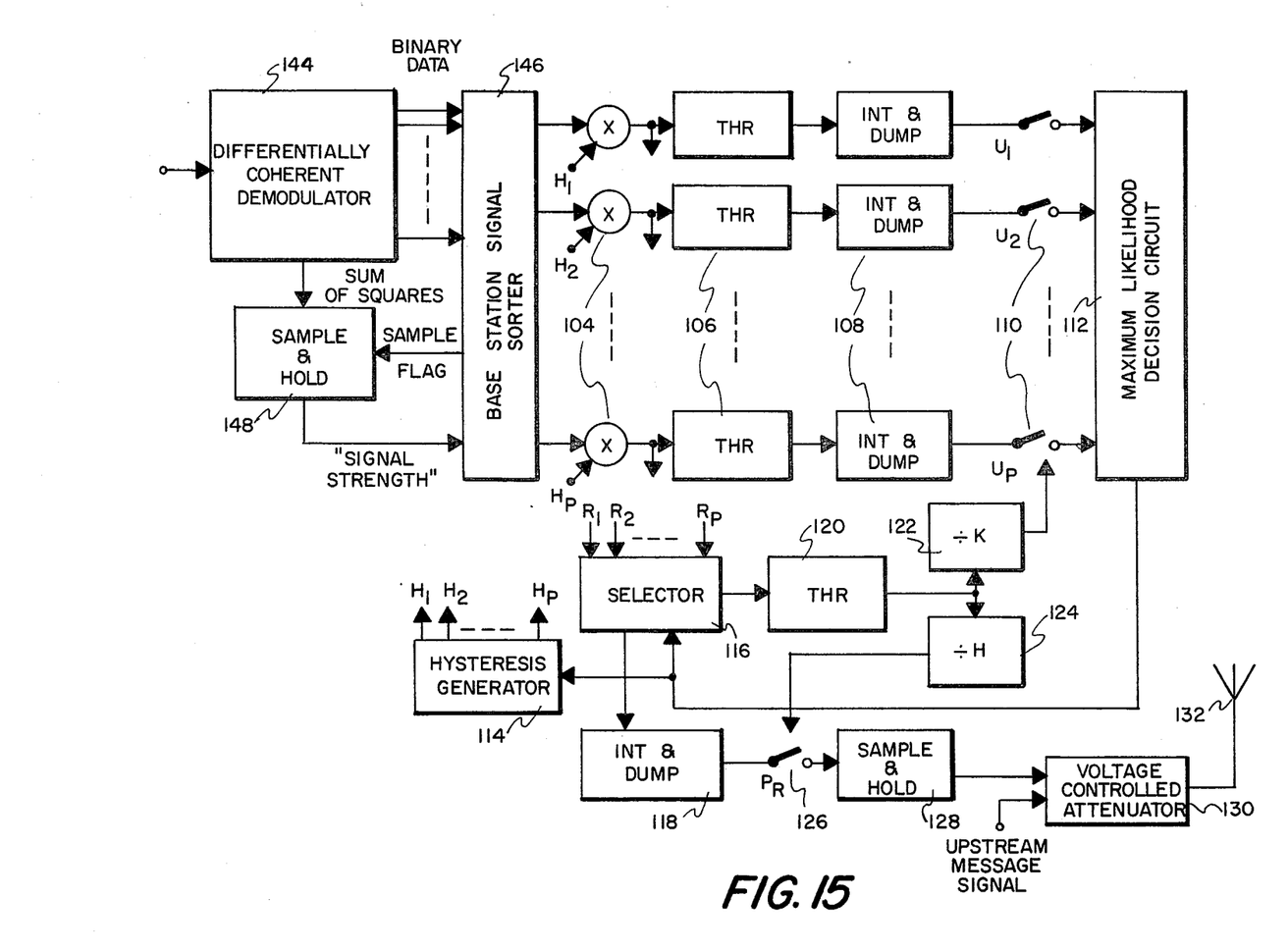
FIG. 15 is a block diagram of an alternate embodiment of the power control/mobile locator system that can be utilized in this invention.

One implementation of such a modified power control/mobile locator is shown in FIG. 15. As shown, the functions of this modified power controller/mobile locator are the same as described in connection with the unit as shown in FIG. 12 except that the input from the IF is coupled to a differentially coherent demodulator 144, the binary data output from which is coupled through base station signal sorter 146 to the weighting circuits 104, and the sum of squares output from which is coupled through sample and hold circuit 148 to the base station signal sorter 146 as a signal strength signal.

If a digitized version of the signal-strength signal is made available, the entire operation of the power control/mobile locator system may be implemented digitally. A high-speed microprocessor, supported by suitable software, would be ideal for this purpose, and could probably form the nucleus of the entire receiver.

Thus, it is felt that this invention provides a new system and method that is unprecedented. The spread-spectrum cellular land mobile system of this invention has numerous inherent advantages over alternative (FM) technology, such as, for example:

(1) The use of large number of frequencies in each waveform results in a form of frequency diversity that significantly reduces the degradation in performance that arises in FM from rapid fading;

(2) Any user can access the system at any time without waiting for a free channel. Thus, there are no blocked calls in the usual sense, as may occur with FM;

(3) Unlike FM, there is no hard limit on the number of active users that can be handled simultaneously by the system. When the number of active users exceeds the design value, the result is a degradation of performance for all users rather than denial of access. This is usually referred to as "graceful degradation";

(4) Since each potential user of the system is assigned a unique signal set, message privacy is achieved as a fringe benefit. This, of course, refers to privacy with respect to the casual listener and does not preclude message interception by a properly equipped third party. (Privacy in FM requires a "scrambler" type installation to be installed);

(5) Because each user retains his unique signal set permanently, there is no channel switching or address changes as the user moves from cell to cell. Hence the particularly objectionable characteristic of FM systems known as "forced termination", which occurs when a mobile crosses a boundary into a cell in which no channel is available, will not occur in this system;

(6) Since all users occupy the same band, all user hardware is identical except for the filter associated with the unique signal set;

(7) Priority messages (e.g., public safety vehicles) can be accommodated in the system, even in the presence of system overload, without assigning dedicated channels or denying other users access to the system. This can be done either by increasing the power level, on an emergency basis, or by increasing the time-bandwidth product of the signal set; and (8) Under circumstances in which the full capacity of the system is not required, a spread spectrum system may co-exist in the same frequency band as conventional narrowband systems without excessive mutual interference. This suggests the possibility that a spread spectrum system could be phased into operation in a given geographical area without immediately obsoleting existing equipment operating in the same band.

What is claimed is:

1. A spread spectrum apparatus for a cellular communication system, said apparatus comprising:
    a central controller;
    a plurality of spaced base stations operationally connected with said central controller and positioned within preselected cells, each of said base stations being capable of transmitting and receiving different predetermined sets of time-frequency coded waveforms modulated by differential biphase coding at a rate determined by orthogonal sequences of message information with said waveforms extending over a predetermined frequency spectrum common to each of said base stations; and
    a plurality of units within said cells with each of said units being operatively responsive only to a predetermined one of said sets of time-frequency coded waveforms to thereby establish selective communication between said base stations and said units.

2. The apparatus of claim 1 wherein said apparatus is used in a mobile communication system, wherein said base stations are fixed stations with a different station centrally located in each of said cells, and wherein said units are located in mobile units capable of moving from cell to cell.

3. The apparatus of claim 2 wherein said base stations and said units both transmit and receive messages included in said sets of time-frequency coded waveforms.

4. The apparatus of claim 3 wherein said predetermined frequency spectrum is divided so that one portion is utilized for mobile unit to base station transmission and the other portion is utilized for base station to mobile unit transmission.

5. The apparatus of claim 2 wherein each of said mobile units includes power control means to maintain the average signal received at a base station approximately constant regardless of the location of said mobile unit within the cell in which said base station is located.

6. The apparatus of claim 1 wherein said sets of time-frequency coded waveforms have large time-bandwidth products such that interferring signals are suppressed.

7. The apparatus of claim 1 wherein said base station and said units include modulation means whereby message information is digitized and the resulting binary sequences encoded into said sets of time-frequency waveforms.

8. The apparatus of claim 7 wherein said base station and said units include demodulator means wherein the phases of each received waveform are compared with those of the preceding waveform.

9. The apparatus of claim 8 wherein said demodulator means includes a tapped delay line, bandpass filters, delays, product detectors, lowpass filters, samplers controlled by a threshold detector, and a linear combining and maximum-likelihood decision circuit.

10. A spread spectrum apparatus for a cellular communication system, said apparatus comprising:
    a central controller;
    a plurality of fixed base stations each of which is centrally located in a different geographical cell, each of said base stations being operatively connected with said central controller and capable of transmitting and receiving different predetermined sets of time-frequency coded waveforms modulated by differential biphase coding at a rate determined by orthogonal sequences of message information with said waveforms extending over a predetermined frequency spectrum common to each of said base stations; and a plurality of mobile units each of which is capable of movement between said cells, each of which is capable of transmitting and receiving only one predetermined set of said sets of time-frequency coded waveforms, and each of which includes power control means whereby transmitted signals are received at the base station with the cell of the transmitting mobile unit at an approximately constant average level.

11. The apparatus of claim 10 wherein said sets of time-frequency coded waveforms have uniformly small cross correlation functions for any relative time shift.

12. The apparatus of claim 11 wherein said sets of time-frequency coded waveforms are composed of time-frequency coded signals having one-coincidence properties.

13. The apparatus of claim 12 wherein said sets of time-frequency coded waveforms have a duration of $T = mt_1$ where $t_1$ is the chip duration and m is one less than a prime number, with a predetermined constant frequency being transmitted during each chip that differs from the preselected nominal carrier frequency by an integral multiple of a predetermined basic frequency shift.

14. The apparatus of claim 10 wherein each of said mobile units includes means connected with said power control means to initiate a signal requesting base station transfer when a mobile unit is sensed outside the cell containing the base station then in communication with said mobile unit.

15. A signal demodulator for a spread spectrum communication system, said demodulator comprising:

first means for receiving a spread spectrum input signal that includes waveforms having time chips with differential biphase coding at a rate determined by orthogonal sequences of message information and demodulating the information contained in the time chips of two adjacent waveforms thereof; and second means connected with said first means and responsive to an output therefrom deciding if the input signal is the desired signal and if so decoding the same.

16. The demodulator of claim 15 wherein said first means includes a tapped delay line, a set of bandpass filters, and a set of multipliers to demodulate the differential phase modulation.

17. The demodulator of claim 16 wherein said bandpass filters have center frequencies that correspond to the requirements of the received desired signal.

18. The demodulator of claim 15 wherein said second means includes a set of low pass filters, a threshold circuit controlling a set of sampling switches, and a linear combiner and maximum likelihood decision circuit.

19. A power control and mobile locator unit for a spread spectrum communications system, said power control and mobile locator unit comprising:

a plurality of demodulators each of which receives different predetermined control signals each of which produces an output that is a scalar signal proportional in magnitude to the power of the received incoming signal;

a plurality of weighting circuits each of which receive a different one of said outputs from said plurality of demodulators and multiplies the same by a predetermined constant to thereby introduce hysteresis;

a plurality of threshold circuits each of which receives a different one of said outputs from said weighting circuits;

a plurality of integrate and dump circuits each of which receives a different one of said outputs from said plurality of threshold circuits;

a plurality of sampling switches each of which is connected with a different one of said integrate and dump circuits; and a maximum likelihood decision circuit for receiving the outputs from said integrate and dump circuits and identifying the nearest base station therefrom.

20. A method for forming a signal set for a spread spectrum communication system, said method comprising:

generating algorithmically a small set of long-duration time-frequency coded signals to form a basic signal set;

dividing the formed basic signal set into a plurality of shorter signals retaining the same properties of the basic signal set to define a channel; and modulating message data on each channel by differential biphase modulation at a rate determined by orthogonal sequences of message information.

* * * * *